United States Patent
Yang et al.

(10) Patent No.: US 9,255,387 B2
(45) Date of Patent: Feb. 9, 2016

(54) QUICK ASSEMBLY STRUCTURE OF FAUCET HANDLE BASE

(71) Applicant: Globe Union Industrial Corp., Taichung (TW)

(72) Inventors: Hongpei Yang, Guangdong (CN); Jihtung Chang, Taichung (TW)

(73) Assignee: GLOBE UNION INDUSTRIAL CORP., TAICHUNG (TW)

( * ) Notice: Subject to any disclaimer, the term of this patent is extended or adjusted under 35 U.S.C. 154(b) by 141 days.

(21) Appl. No.: 14/288,576

(22) Filed: May 28, 2014

(65) Prior Publication Data

US 2015/0345118 A1   Dec. 3, 2015

(51) Int. Cl.
  *E03C 1/04*   (2006.01)
  *F16K 31/60*   (2006.01)

(52) U.S. Cl.
  CPC .............. *E03C 1/0401* (2013.01); *F16K 31/60* (2013.01); *Y10T 137/6024* (2015.04)

(58) Field of Classification Search
  CPC ..... E03C 1/0401; E03C 1/0412; F16K 31/60; F16L 37/10; F16L 37/113; F16L 37/24; F16L 37/244; F16L 37/2445; F16L 37/252
  See application file for complete search history.

(56) References Cited

U.S. PATENT DOCUMENTS

| | | | | |
|---|---|---|---|---|
| 4,593,430 A * | 6/1986 | Spangler | ................. | B25G 3/18 16/422 |
| 5,025,826 A * | 6/1991 | Schoepe | ................. | F16K 31/60 137/315.15 |
| 5,685,341 A * | 11/1997 | Chrysler | ............... | E03C 1/0403 137/801 |
| 6,209,153 B1 * | 4/2001 | Segien, Jr. | ............. | E03C 1/0401 137/359 |
| 6,438,771 B1 * | 8/2002 | Donath, Jr. | ............. | F16K 31/60 137/359 |
| 8,381,759 B1 * | 2/2013 | Chen | ...................... | F16K 31/60 137/315.15 |
| 2004/0144434 A1 * | 7/2004 | Jones | ........................ | E03C 1/04 137/637.2 |
| 2005/0236047 A1 * | 10/2005 | Thomas | .................... | E03C 1/04 137/359 |
| 2010/0272503 A1 * | 10/2010 | Pitsch | ................. | F16B 37/0864 403/21 |
| 2013/0020794 A1 * | 1/2013 | Stokes | ................. | E03C 1/0403 285/8 |

* cited by examiner

*Primary Examiner* — Craig Schneider
*Assistant Examiner* — Kevin Barss

(57) ABSTRACT

A quick assembly structure of a faucet handle base, which is fixed in a valve assembly, the valve assembly includes a valve core, a directional connector, a locking element having a peripheral groove, a connecting portion, and a tilted guiding face. The handle mount includes: a fixing ring having a central orifice; a flexible fastening sleeve having a lower engagement portion and an upper engagement portion; the upper engagement portion having a plurality of flexible retaining paws; a coupling column having a fitting portion and a snapping insertion; the sapping insertion having plural first recesses; an operating member having a covering portion and a handle extending; and a coupling element employed to join a top end of the sapping insertion of the coupling column with the covering portion of the operating member.

16 Claims, 10 Drawing Sheets

...

QUICK ASSEMBLY STRUCTURE OF FAUCET HANDLE BASE

FIELD OF THE INVENTION

The present invention relates to a faucet handle base of a faucet, and more particularly to a quick assembly structure of the faucet handle base.

BACKGROUND OF THE INVENTION

A conventional faucet, such as a two handle faucet, contains a body, a decorative cover, an outlet member, two valve assemblies, and two handle mounts. The body is formed in a H shape and includes two inlet seats disposed on two sides thereof, at least one outlet connector mounted on a middle section thereof, a cold-water support and a hot-water support extending outwardly from a bottom end thereof and screwing with two screwing elements via a basin, thus fixing the body on the basin. The decorative cover is covered on the basin so that the body is hidden between the decorative cover and the basin, and the body includes two first orifices defined on the two sides thereof and a second orifice formed on a middle section thereof opposite to the two inlet seats and the outlet connector. The outlet member is joined with the outlet connector of the body and flows water therefrom. The two valve assemblies are fixed on the inlet seats of the body. The two handle mounts are disposed on and rotate the two valve assemblies, thus controlling a water supply.

A conventional quick assembly structure of the faucet handle base is disclosed in TW Utility Model No. M271998 and M472141 and contains a handle mount through which a screw is inserted to screw and contact with a valve assembly, such that the handle mount is fixed on the valve assembly. However, the handle mount has a hole defined thereon to cause poor appearance even though a plug is inserted into the hole.

In addition, in operation, a plug and the screw are unscrewed by a tool to remove the handle mount. The screw is inserted through the handle mount and the valve assembly by ways of the tool, and the plug is retained into the hole, thus causing troublesome operation by using the tool. To insert the plug into the hole smoothly, it is made of plastic material. But the handle mount is made of metal material to have inconsistent appearance. Furthermore, water will leak from the hole to rust the screw.

The present invention has arisen to mitigate and/or obviate the afore-described disadvantages.

SUMMARY OF THE INVENTION

One aspect of the present invention is to provide a quick assembly structure of a faucet handle base which is capable of overcoming the shortcomings of the conventional quick assembly structure.

To obtain the above, a quick assembly structure of a faucet handle base provided by the present invention is fixed in a valve assembly, the valve assembly includes a valve core.

The valve assembly further includes:
a directional connector positioned on and driving the valve assembly;
a locking element having a peripheral groove, a connecting portion below the peripheral groove, and a tilted guiding face above the peripheral groove; the locking element being disposed on a top end of the valve core by ways of the connecting portion.

The handle mount includes:
a fixing ring having a central orifice defined therein;
a flexible fastening sleeve having a lower engagement portion and an upper engagement portion extending upwardly form the lower engagement portion; the lower engagement portion engaging with the fixing ring to limit the flexible fastening sleeve to move upwardly away from the fixing ring and to rotate relative to the fixing ring; the upper engagement portion having a plurality of flexible retaining paws arranged therearound;
a coupling column having a fitting portion for fitting with the upper engagement portion of the flexible fastening sleeve and a snapping insertion extending upwardly from the fitting portion; the fitting portion being fitted on and driving the directional connector; the sapping insertion having plural first recesses arranged therearound to insert the plurality of flexible retaining paws of the flexible fastening sleeve, and the tilted guiding face of the fixing ring abutting against and guiding the sapping insertion to slide into and retain with the plurality of flexible retaining paws, hence the coupling column is stopped removal from the fixing ring; when the coupling column is slightly rotated relative to the flexible fastening sleeve, the plurality of flexible retaining paws expand flexibly to remove from the peripheral groove;
an operating member having a covering portion and a handle extending outwardly from the covering portion; the covering portion being fitted on the fixing ring and accommodating the coupling column and the flexible fastening sleeve therein;
a coupling element employed to join a top end of the sapping insertion of the coupling column with the covering portion of the operating member.

Accordingly, the fixing ring retains with the flexible fastening sleeve, so when the user removes each handle mount, the fixing ring is grasped with one hand, and the covering member is rotated clockwisely or counterclockwise with the other hand. The covering member is rotated counterclockwise to drive the coupling column to rotate counterclockwise. The flexible fastening sleeve cannot be rotated due to the fixing ring is grasped, and when a side fringe of each first recess abuts against the hook portion of the flexible claw, the hook portion removes from the peripheral groove of the directional connector so that the coupling column removes upwardly from the directional connector, hence each handle mount is pulled upwardly to move away from each valve assembly, thereby removing each handle mount quickly.

Also, each handle mount is aligned and fitted with each valve assembly in installation site easily. In contrast, the fixing ring is grasped, the covering member is rotated slightly, and each handle mount is lifted upwardly to remove from each valve assembly quickly.

Thereby, each handle mount is removed from each valve assembly without using any tool, so drilling opening(s) on the covering member and the fixing ring like the conventional quick assembly structure is eliminated, thus achieving aesthetic appearance of each handle mount.

It is preferably that since drilling the opening(s) on the covering member and the fixing ring is eliminated, the water will not leak from the opening(s) to obtain the waterproof effect.

DETAILED DESCRIPTION OF THE PREFERRED EMBODIMENTS

Figure 1:
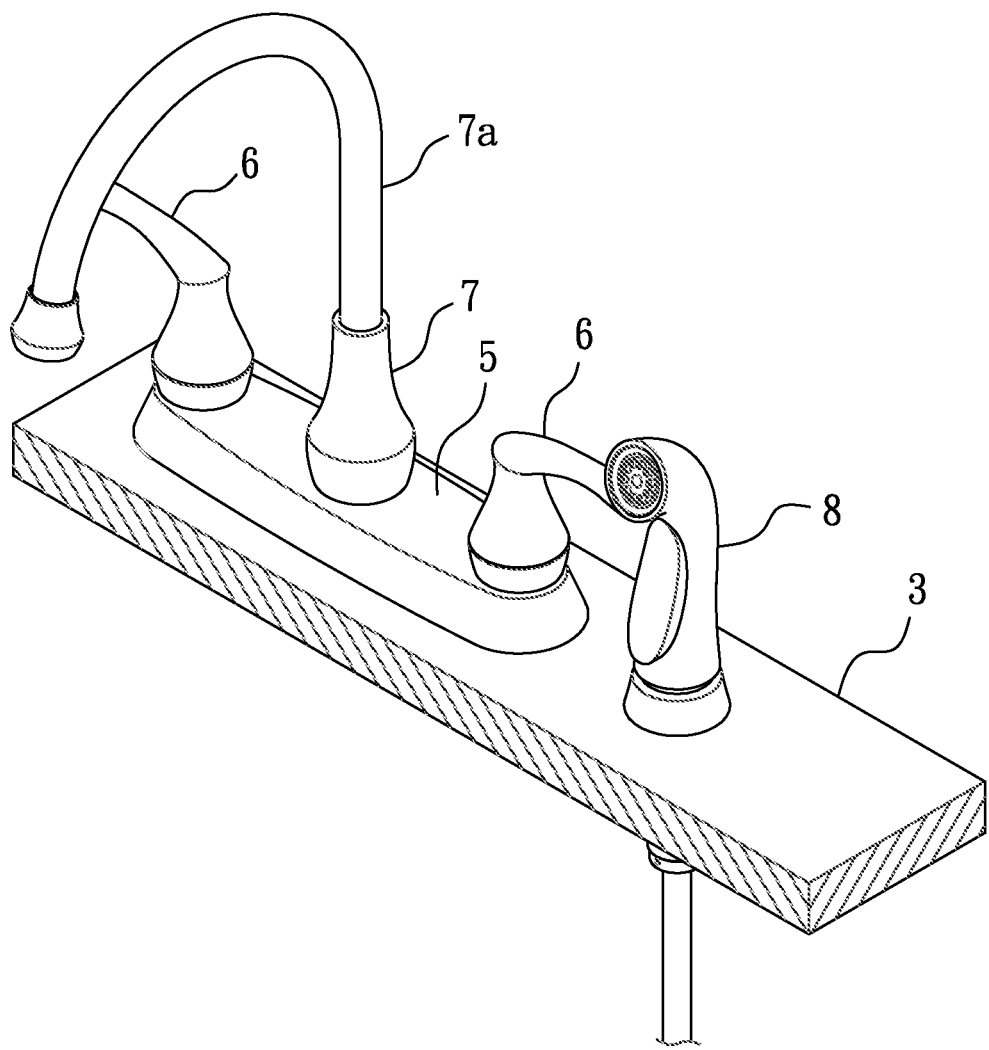
FIG. 1 is a perspective view showing the assembly of a faucet according to a preferred embodiment of the present invention.
Figure 2:
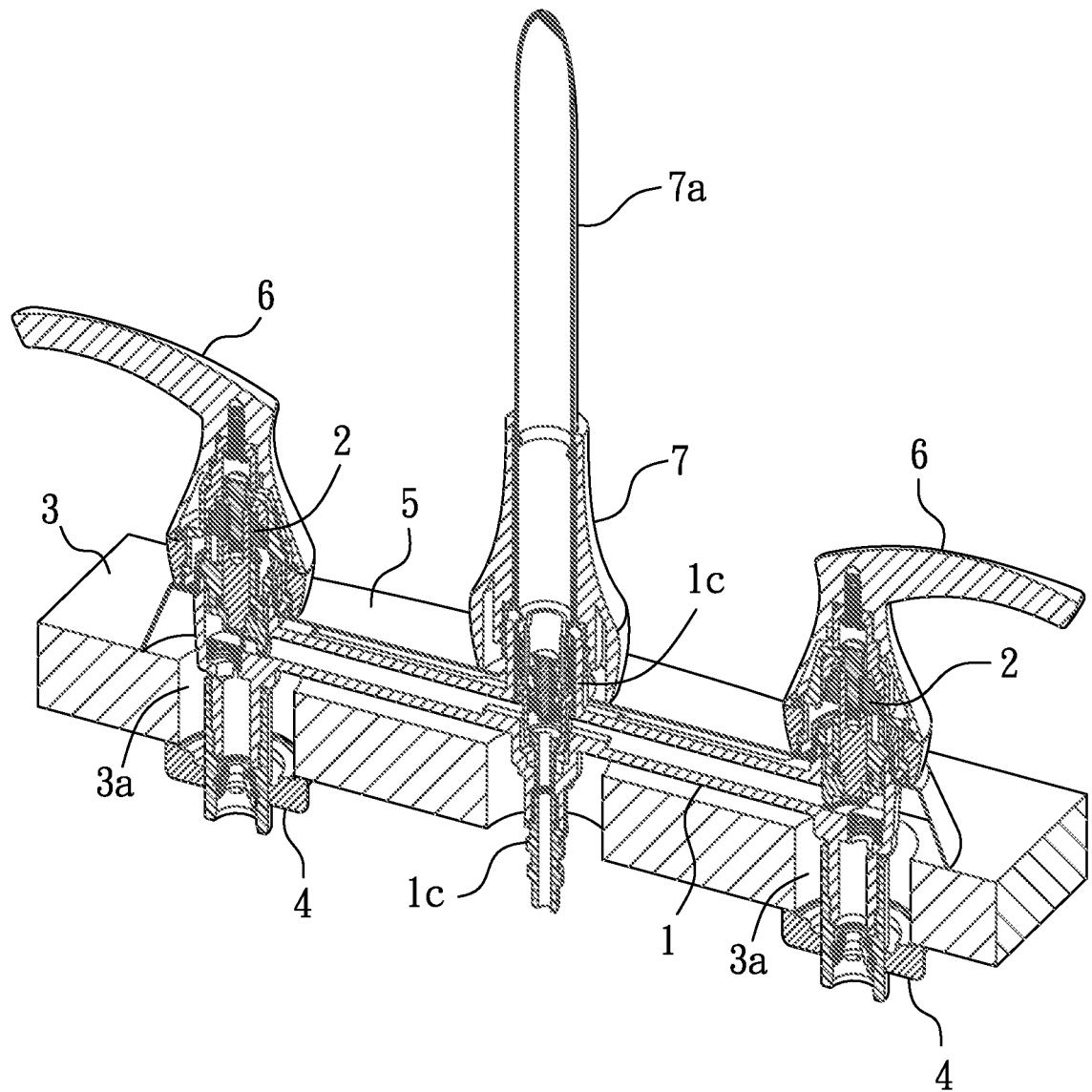
FIG. 2 is a perspective view showing a cross section of a part of the faucet according to the preferred embodiment of the present invention.
Figure 3:
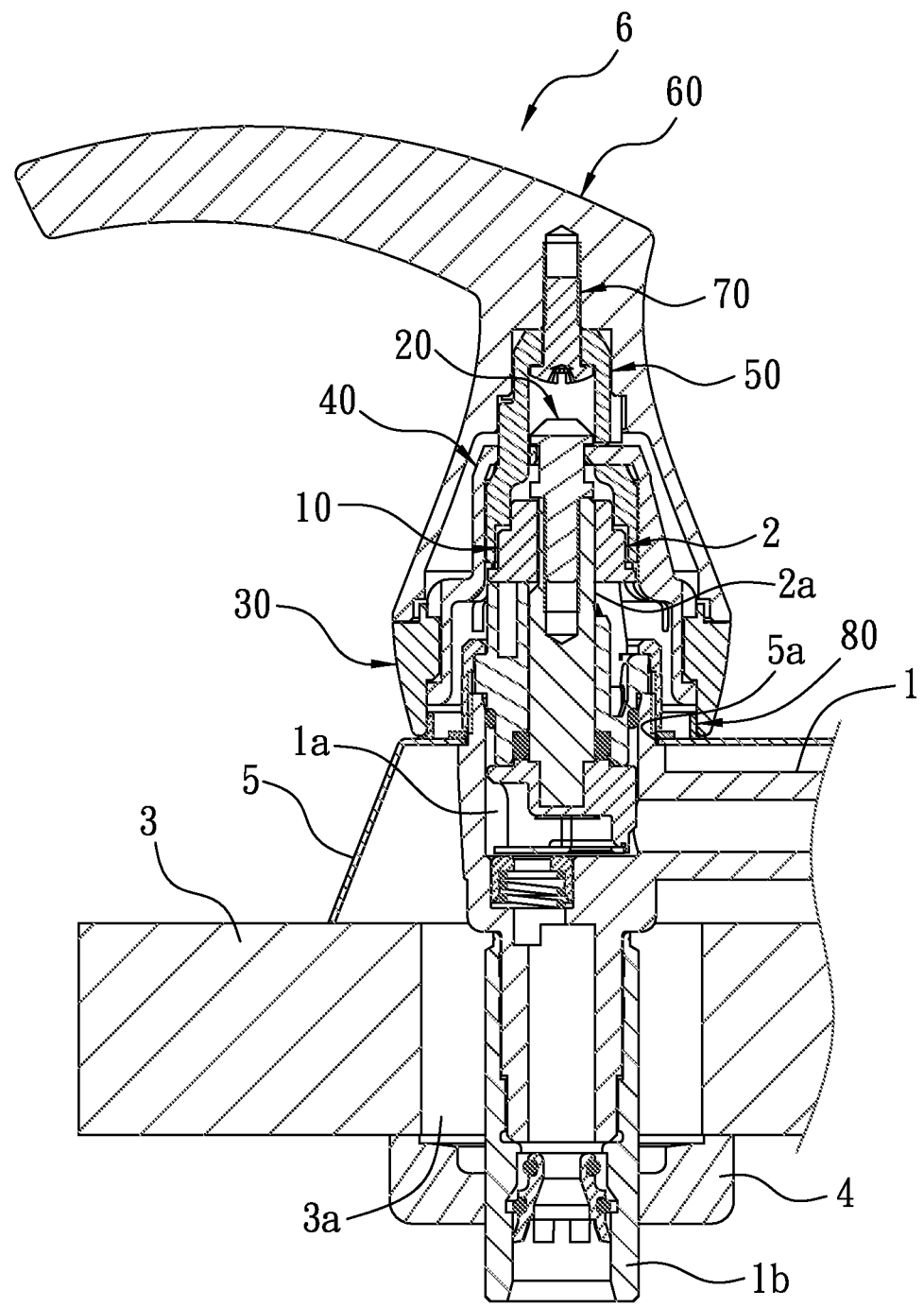
FIG. 3 is a cross sectional view showing the assembly of one of two handle mounts of the faucet according to the preferred embodiment of the present invention.

With reference to FIGS. 1-3, a quick assembly structure of a faucet handle base according to a preferred embodiment of the present invention is fixed in a two handle faucet which includes a body 1 in a H shape, the body 1 includes two inlet valve seats 1a disposed on two sides of a top end thereof, two valve assemblies 2 mounted on the two inlet valve seats 1a, two inlet supports 1b extending downwardly from a bottom end thereof, inserted through two first through holes 3a of a basin 3, and engaged with two fasteners 4. A decorative cover 5 is covered on the body 1, and the two valve assemblies 2 upwardly extend out of two second through holes 5a on two sides of the decorative cover 5. Two handle mounts 6 are fixed on the two valves assemblies 2 and rotate two valve cores 2a of the two valve assemblies 2 to turn on/off cold water supply and hot water supply from the two inlet supports 1b via at least one outlet connector 1c. In this embodiment, there are two outlet connectors 1c arranged, wherein one of the two outlet connectors is inserted through the decorative cover 5 to connect with an outlet member 7 with an outlet elbow 7a, and the other of the two outlet connectors 1c is coupled with a spray head 8 secured on the basin 3 and located adjacent to one of the two handle mounts 6. Since above-mentioned components are a well-known art, further remarks are omitted.

Figure 4:
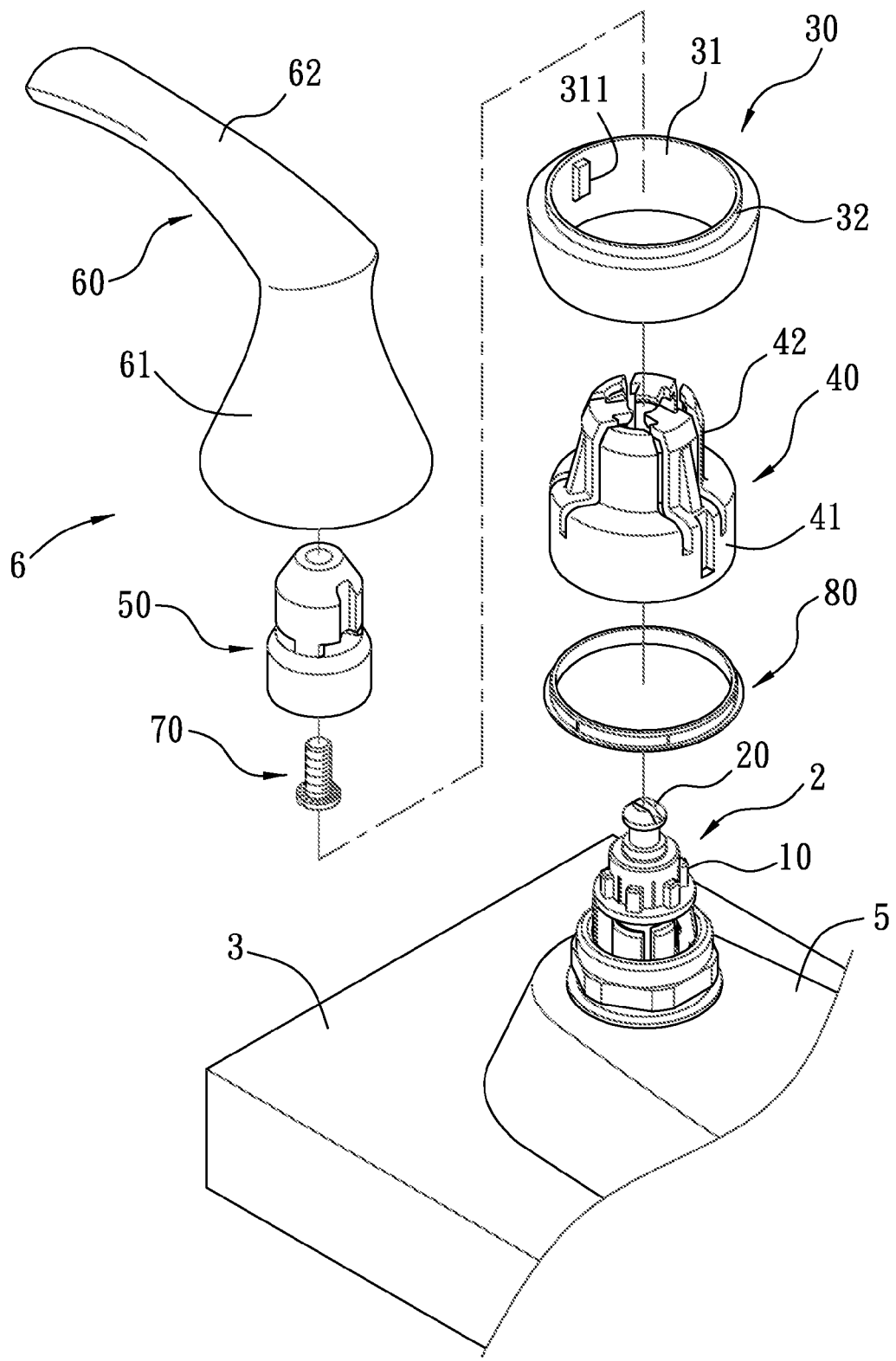
FIG. 4 is a perspective view showing the exploded components of a part of the handle mount of the faucet according to the preferred embodiment of the present invention.
Figure 5:
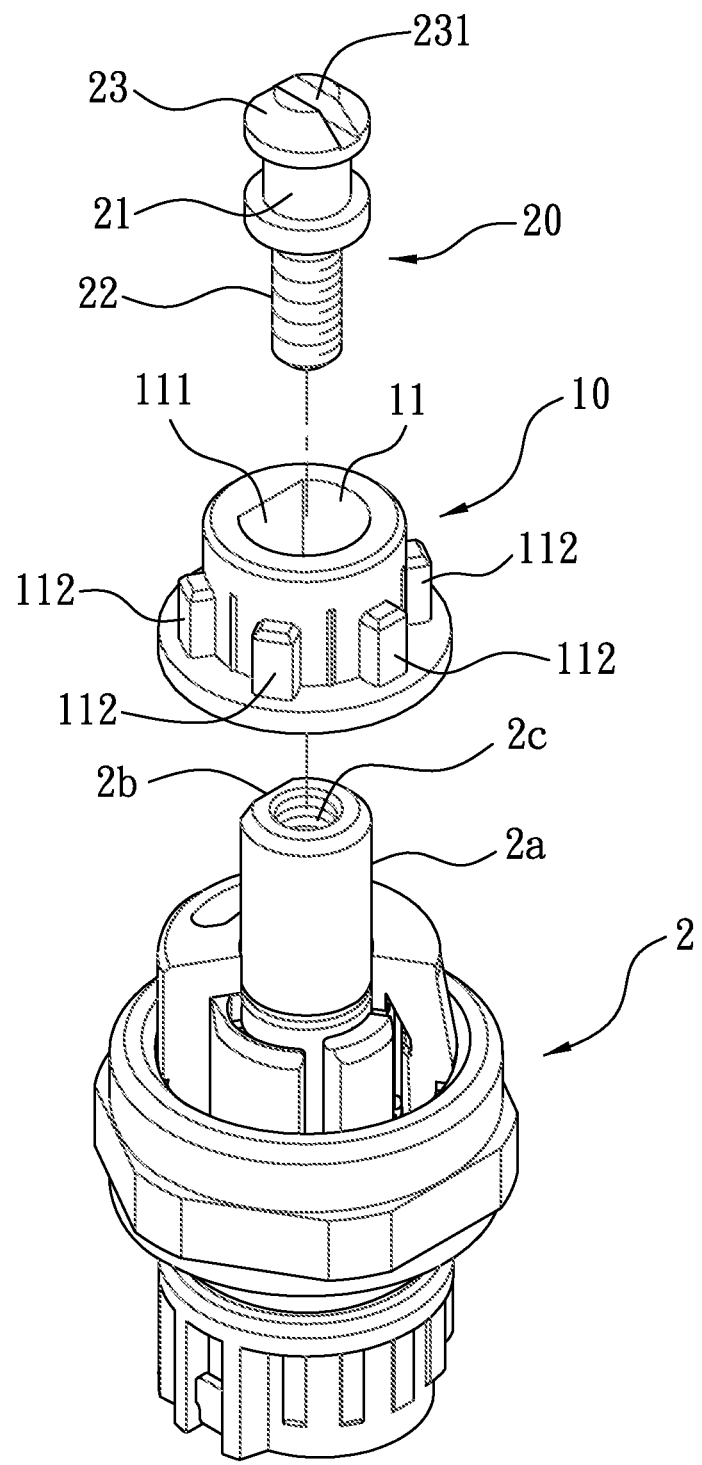
FIG. 5 is a perspective view showing the exploded components of a partial valve assembly of a quick assembly structure of a faucet handle base according to the preferred embodiment of the present invention.

Referring to FIGS. 3 to 5, the quick assembly structure of the faucet handle base of the present invention comprises:

each valve assembly 2 including a directional connector 10 and a locking element 20; wherein the directional connector 10 is positioned on and drives each valve core 2a to rotate. The locking element 20 has a peripheral groove 21, a connecting portion 22 below the peripheral groove 21, and a tilted guiding face 23 above the peripheral groove 21; the locking element 20 is disposed on a top end of each valve core 2a by ways of the connecting portion 22.

The directional connector 10 includes an axial orifice 11 for retaining the directional connector 10 with each valve core 2a, and the axial orifice 11 has a stop fence 111 formed therein to correspond to a tangent plane 2b defined on an outer wall of the top end of each valve core 2a so that the directional connector 10 drives each valve core 2a to rotate.

The locking element 20 is similar to a screw bolt and its connecting portion 22 has outer threads, the locking element 20 includes a cutout 231 defined on the tilted guiding face 23 to retain with a tool, such as a slotted screwdriver, such that the locking element 20 is rotated after the tool is retained with and rotate the cutout 231. Each valve core 2a has a screwing orifice 2c formed on the top end thereof to screw with the outer threads of the connecting portion 22.

Figure 6:
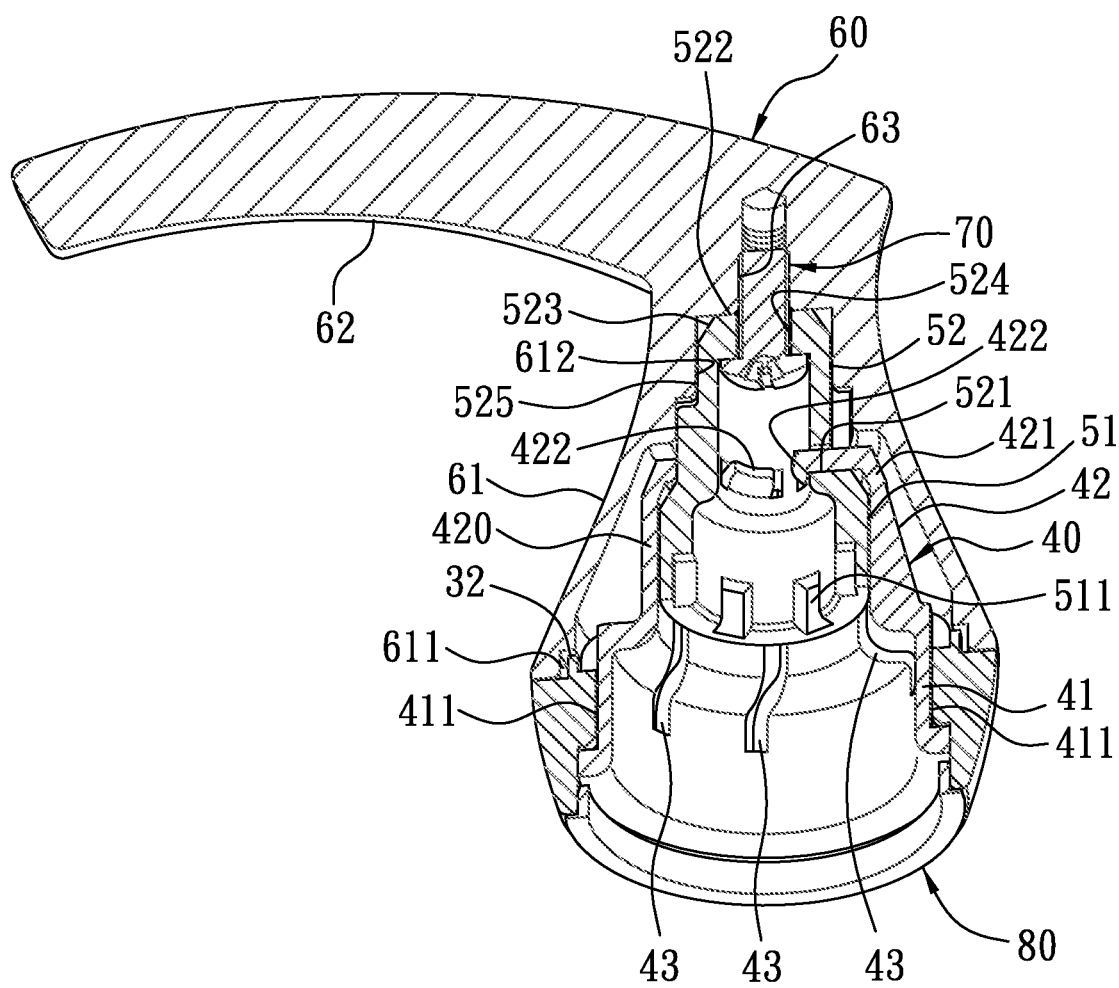
FIG. 6 is a cross-sectional perspective view showing the assembly of the handle mount of the faucet according to the preferred embodiment of the present invention.

As shown in FIGS. 4 and 6, each handle mount 6 includes a fixing ring 30, a flexible fastening sleeve 40, a coupling column 50, an operating member 60, a coupling element 70, and a waterproof washer 80.

The fixing ring 30 has a central orifice 31 defined therein.

Figure 7:
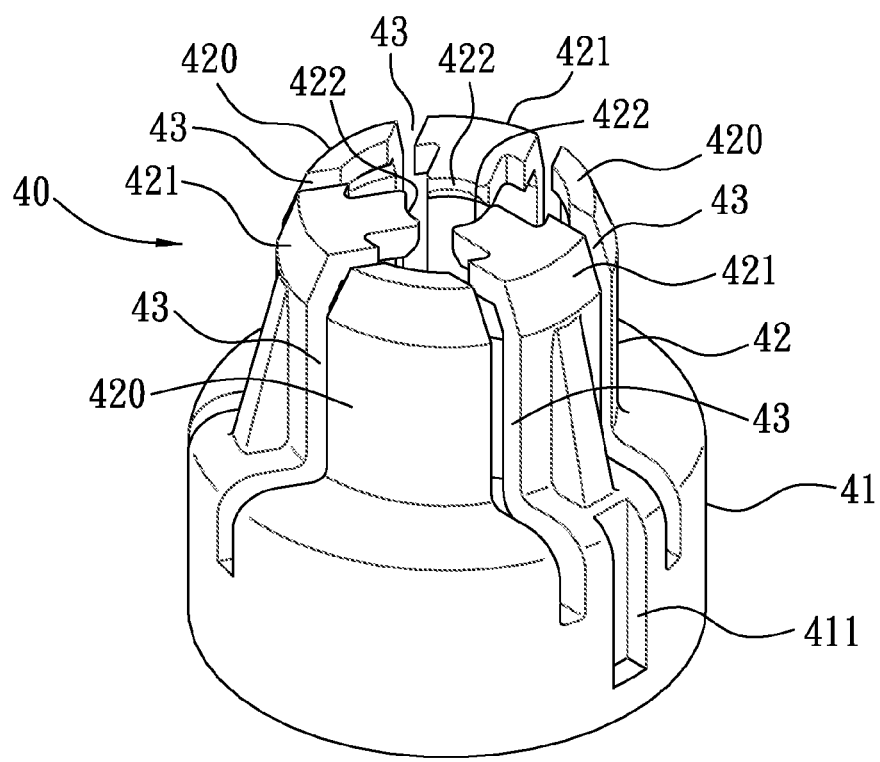
FIG. 7 is a perspective view showing the assembly of a flexible fastening sleeve of the quick assembly structure of the faucet handle base according to the preferred embodiment of the present invention.
Figure 8:
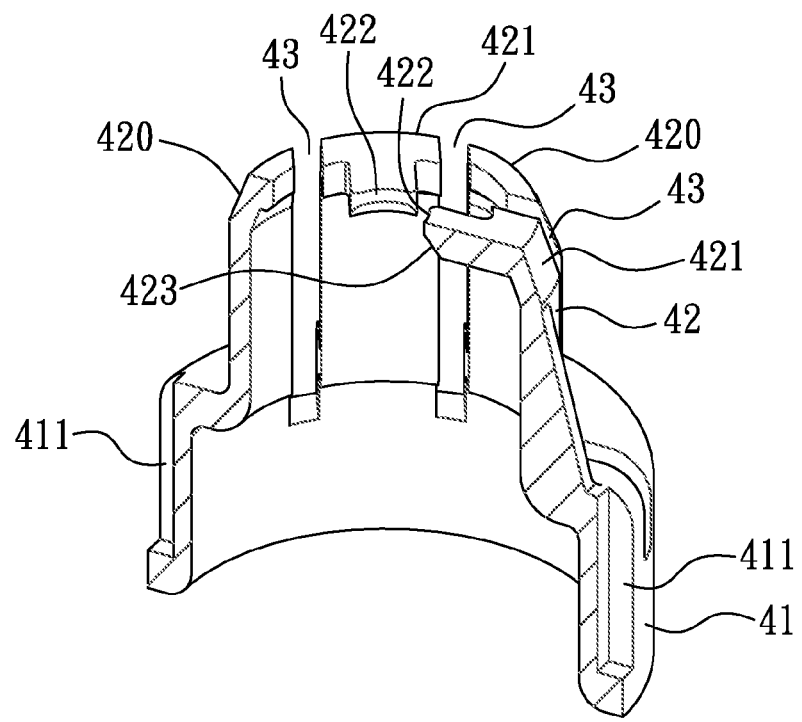
FIG. 8 is a cross-sectional perspective view showing the assembly of the flexible fastening sleeve of the quick assembly structure of the faucet handle base according to the preferred embodiment of the present invention.
Figure 9:
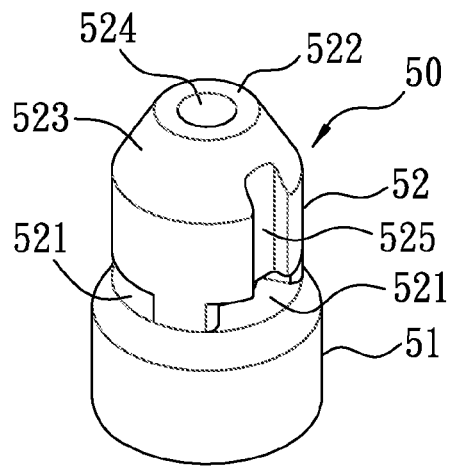
FIG. 9 is a perspective view showing the assembly of a coupling column of the quick assembly structure of the faucet handle base according to the preferred embodiment of the present invention.

The flexible fastening sleeve 40, as illustrated in FIGS. 7 and 8, has a lower engagement portion 41 and an upper engagement portion 42 extending upwardly form the lower engagement portion 41. The lower engagement portion 41 engages with the fixing ring 30 to limit the flexible fastening sleeve 40 to move upwardly away from the fixing ring 30 and to rotate relative to the fixing ring 30. The upper engagement portion 42 has a plurality of flexible retaining paws 421 arranged therearound.

To limit the flexible fastening sleeve 40 to move upwardly away from the fixing ring 30 and to rotate relative to the fixing ring 30, two longitudinal engaging blocks 311 are symmetrically mounted on an inner wall of the central orifice 31, as shown in FIG. 4, and two longitudinal slots 411 are symmetrically defined on an outer wall of the lower engagement portion 41, such that when the flexible fastening sleeve 40 upwardly extends out of the central orifice 31 of the fixing ring 30, the two longitudinal engaging blocks 311 slide into and retain with the two longitudinal slots 411.

With reference to FIGS. 9 to 12, the coupling column 50 includes a fitting portion 51 for fitting with the upper engagement portion 42 of the flexible fastening sleeve 40 and a snapping insertion 52 extending upwardly from the fitting portion 51. The fitting portion 51 is further fitted on and drives the directional connector 10 of each valve assembly 2. The sapping insertion 52 has plural first recesses 521 arranged therearound to insert the plurality of flexible retaining paws 421 of the flexible fastening sleeve 40, and the tilted guiding face 23 of the fixing ring 20 abuts against and guides the sapping insertion 52 to slide into and retain with the plurality of flexible retaining paws 421, hence the coupling column 50 is stopped removal from the fixing ring 20. When the coupling column 50 is slightly rotated relative to the flexible fastening sleeve 40, the plurality of flexible retaining paws 421 expand flexibly to remove from the peripheral groove 21.

Figure 11:
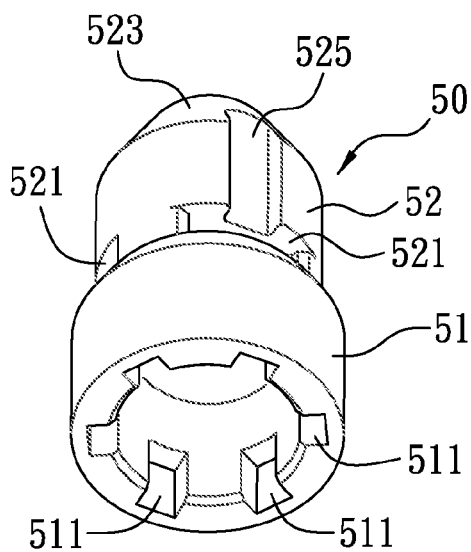
FIG. 11 is also another perspective view showing the assembly of the coupling column of the quick assembly structure of the faucet handle base according to the preferred embodiment of the present invention.
Figure 12:
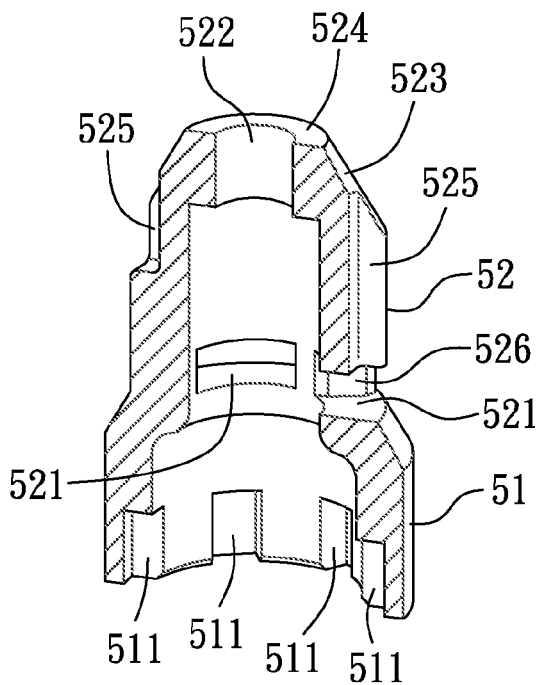
FIG. 12 is a cross-sectional perspective view showing the assembly of the coupling column of the quick assembly structure of the faucet handle base according to the preferred embodiment of the present invention.

As shown in FIGS. 5 and 11, the coupling column 50 stabilizes and transmits a rotating force exerted by a user toward the directional connector 10 to drive each valve core 2a. In this embodiment, the directional connector 10 includes a plurality of tabs 112 extending outwardly around a peripheral wall thereof, and the coupling column 50 includes plural notches 511 formed around an inner wall of the fitting portion 51 of the coupling column 50 to retain with the plurality of tabs 112. In this embodiment, there are six tabs 112 arranged to retain with six notches 511.

An outer diameter of the upper engagement portion 42 of the flexible fastening sleeve 40 is greater than the lower engagement portion 41 so as to insert the upper engagement portion 42 through the central orifice 31 of the fixing ring 30, and the upper engagement portion 42 has a plurality of trenches 43 extending from a top end thereof to a top end of the lower engagement portion 41, such that between any two trenches 43 is defined a flexible pawl 420 or a flexible claw 421, and between any two adjacent claws 421 is defined a flexible pawl 420, wherein a difference of the flexible pawl 420 from that of the flexible claw 421 contains: the flexible claw 421 having a hook portion 422 extending outwardly from a top end thereof and retaining with or removing from the peripheral groove 21 via each first recess 521. In this embodiment, there are six trenches 43 provided to define three flexible pawls 420 and three flexible claws 421, and the sapping insertion 52 of the coupling column 50 has three first recesses 521 arranged thereon.

To connect the flexible fastening sleeve 40 and the coupling column 50 together, the hook portion 422 of the flexible claw 421 has an oblique face 423 formed thereon as illustrated in FIG. 8, and the sapping insertion 52 of the coupling column 50 has a top fence 522 and a conical tilting face 523 opposite to the top fence 522, such that the coupling column 50 is upwardly inserted through the flexible fastening sleeve 40 to expand flexibly by abutting the conical tilting face 523 against the oblique face 423 of the hook portion 422, hence the sapping insertion 52 of the coupling column 50 inserts through the flexible pawl 420 and the flexible claw 421 until the hook portion 422 aligns with each first recess 521 of the coupling column 50, and then the hook portion 422 of the flexible claw 421 flexibly retracts to insert into the each first recess 521 of the coupling column 50, thus connecting the flexible fastening sleeve 40 and the coupling column 50 together.

Figure 13:
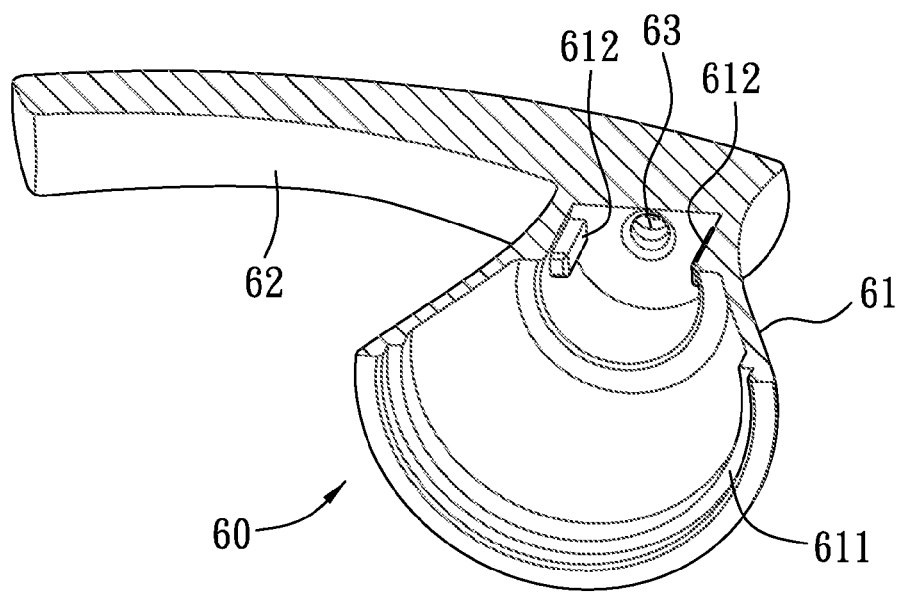
FIG. 13 is a cross-sectional perspective view showing the assembly of an operating member of the quick assembly structure of the faucet handle base according to the preferred embodiment of the present invention.

Referring to FIGS. 4, 6 and 13, the operating member 60 includes a covering portion 61 and a handle 62 extending outwardly from the covering portion 61. The covering portion 61 is fitted on the fixing ring 30 and accommodates the coupling column 50 and the flexible fastening sleeve 40 therein.

As shown in FIGS. 4 and 6, to prevent water leakage from the covering portion 61 of the operating member 60 and the fixing ring 30, the covering portion 61 has a slit 611 defined on a bottom end thereof, and the fixing ring 30 has a peripheral rib 32 extending outwardly around a top end thereof and accommodated in the slit 611 to stop the water outside the peripheral rib 32.

The coupling element 70 is employed to join a top end of the sapping insertion 52 of the coupling column 50 with the covering portion 61 of the operating member 60.

In this embodiment, the coupling element 70 is a forcing bolt, and the top fence 522 of the sapping insertion 52 of the coupling column 50 has an aperture 524 formed in a central portion thereof, the covering portion 61 of the operating member 60 has a threaded aperture 63 arranged on a top wall of the covering portion 61 so that the coupling element 70 screws with the threaded aperture 63 of the operating member 60 via the aperture 524, thus connecting the coupling element 70 with the coupling column 50.

Figure 10:
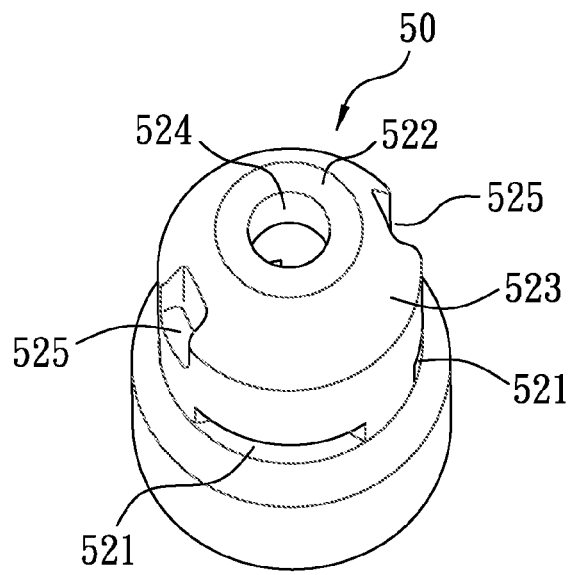
FIG. 10 is another perspective view showing the assembly of the coupling column of the quick assembly structure of the faucet handle base according to the preferred embodiment of the present invention.

To reinforce strength between the coupling column 50 and the operating member 60, to buffer excessive torque onto the coupling element 70, and to avoid loose of the coupling element 70, as illustrated in FIGS. 10 and 13, the coupling column 50 has two second recesses 525 symmetrically formed on an outer wall thereof, and the operating member 60 has two longitudinal protrusions 612 symmetrically arranged on an inner wall thereof to retain with the two second recesses 525.

As illustrated in FIGS. 3, 4 and 6, the waterproof washer 80 is retained on the bottom end of the covering portion 61 of the covering member 60 and contacts with a top wall of the decorative cover 5, such that the water does not leak between the covering portion 61 and the decorative cover 5.

In assembly, each valve assembly 3 is coupled with each handle mount 6. With reference to FIGS. 3 to 5, the directional connector 10 is fixed on each valve core 2a, and then the fixing ring 20 is locked on each valve core 2a, thereafter each valve core 2a is rotated toward a closing position.

As shown in FIGS. 4 and 6, the flexible fastening sleeve 40 is retained in the fixing ring 30, the coupling column 50 is mounted in the flexible fastening sleeve 40, and the fixing ring 30, the flexible fastening sleeve 40 and the coupling column 50 are placed into the covering member 60, the coupling element 70 screws the coupling column 50 and the covering member 60 together, thereafter the waterproof washer 80 is retained on the fixing ring 30, thus assembling each handle mount 6.

Preferably, each handle mount 6 is turned upside down, and the handle 62 is fixed in a suitable direction, the coupling column 50 of each handle mount 6 is aligned and retained with the fixing ring 20 so that the tilted guiding face 23 of the fixing ring 20 guides the hook portion 422 of the flexible claw 421 to flexibly expand and to slidably retain into the peripheral groove 21 of the fixing ring 20 as shown in FIG. 3, thus stopping each handle mount 6 removal from each valve assembly 2. In the meantime, the plural notches 511 of the coupling column 50 retain with the plurality of tabs 112 of the directional connector 10 so that each handle mount 6 drives each valve core 2 to rotate stably, thereby turning on/off water supply. Furthermore, the waterproof washer 80 is biased against the top wall of the decorative cover 5 to obtain waterproof effect.

Figure 14:
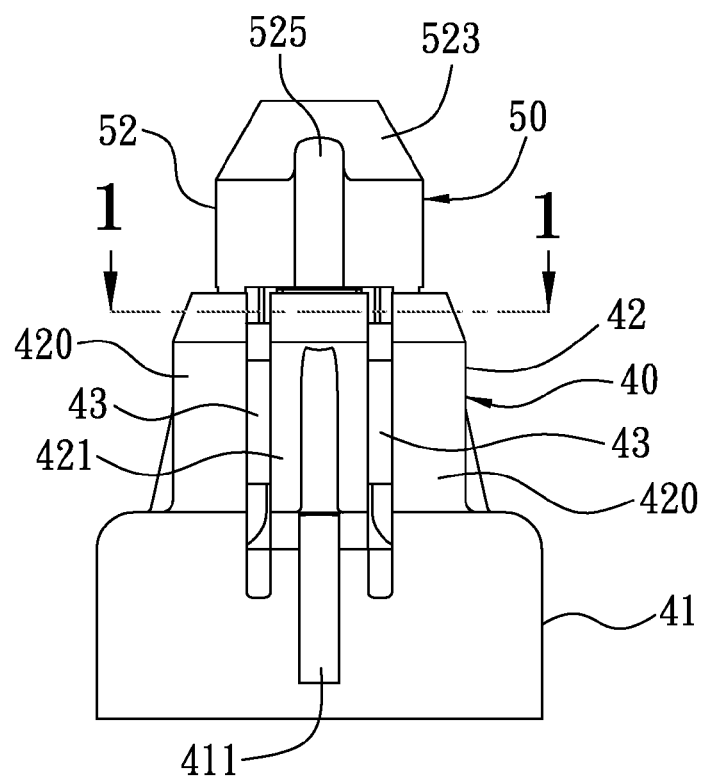
FIG. 14 is a side plan view showing the assembly of a locking element, a flexible fastening sleeve, the coupling column of the quick assembly structure of the faucet handle base according to the preferred embodiment of the present invention.
Figure 15:
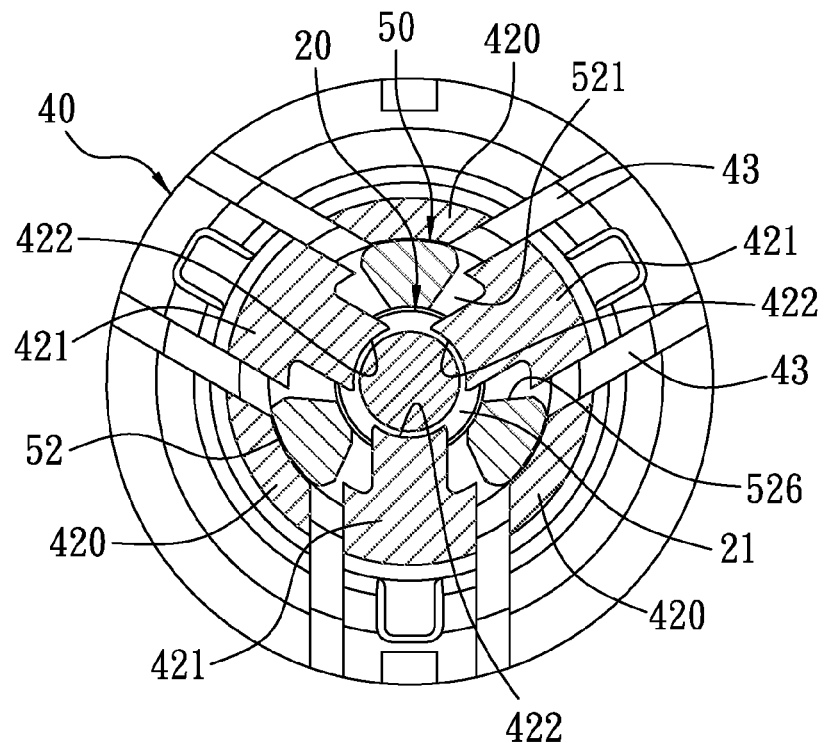
FIG. 15 is a cross sectional view taken along the lines 1-1 of FIG. 14.
Figure 16:
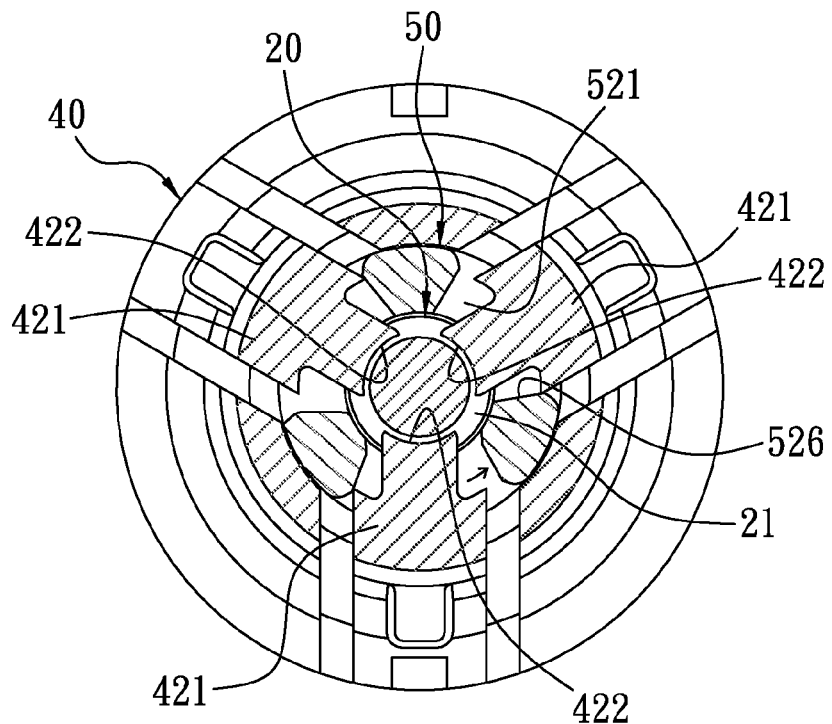
FIG. 16 is a cross sectional view showing the operation of the locking element, the flexible fastening sleeve, and the coupling column of the quick assembly structure of the faucet handle base according to the preferred embodiment of the present invention.

Accordingly, the fixing ring 30 retains with the flexible fastening sleeve 40, so when the user removes each handle mount 6, the fixing ring 30 is grasped with one hand, and the covering member 60 is rotated clockwisely or counterclockwise with the other hand, as illustrated in FIGS. 14 to 16, for example, the covering member 60 is rotated counterclockwise to drive the coupling column 50 to rotate counterclockwise. The flexible fastening sleeve 40 cannot be rotated due to the fixing ring 30 is grasped, and when a side fringe 526 of each first recess 521 abuts against the hook portion 422 of the flexible claw 421, the hook portion 422 removes from the peripheral groove 21 of the directional connector 10 so that the coupling column 50 removes upwardly from the directional connector 10, hence each handle mount 6 is pulled upwardly to move away from each valve assembly 2, thereby removing each handle mount 6 quickly.

Also, each handle mount 6 is aligned and fitted with each valve assembly in installation site easily. In contrast, the fixing ring 30 is grasped, the covering member 60 is rotated slightly, and each handle mount 6 is lifted upwardly to remove from each valve assembly 2 quickly.

Thereby, each handle mount 6 is removed from each valve assembly 2 without using any tool, so drilling opening(s) on the covering member 60 and the fixing ring 30 like the conventional quick assembly structure is eliminated, thus achieving aesthetic appearance of each handle mount 6.

It is preferably that since drilling the opening(s) on the covering member 60 and the fixing ring 30 is eliminated, the water will not leak from the opening(s) to obtain the waterproof effect.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A quick assembly structure of a faucet handle base, which is fixed in a valve assembly, the valve assembly including a valve core and characterized in that:
    the valve assembly further includes:
    a directional connector positioned on and driving the valve assembly;
    a locking element having a peripheral groove, a connecting portion below the peripheral groove, and a tilted guiding face above the peripheral groove; the locking element being disposed on a top end of the valve core by ways of the connecting portion;
    the handle mount includes:
    a fixing ring having a central orifice defined therein;
    a flexible fastening sleeve having a lower engagement portion and an upper engagement portion extending upwardly form the lower engagement portion; the lower engagement portion engaging with the fixing ring to limit the flexible fastening sleeve to move upwardly away from the fixing ring and to rotate relative to the fixing ring; the upper engagement portion having a plurality of flexible retaining paws arranged therearound;
    a coupling column having a fitting portion for fitting with the upper engagement portion of the flexible fastening sleeve and a snapping insertion extending upwardly from the fitting portion; the fitting portion being fitted on and driving the directional connector; the snapping insertion having plural first recesses arranged therearound to insert the plurality of flexible retaining paws of the flexible fastening sleeve, and the tilted guiding face of the fixing ring abutting against and guiding the snapping insertion to slide into and retain with the plurality of flexible retaining paws, hence the coupling column is stopped from removal by the fixing ring; when the coupling column is slightly rotated relative to the flexible fastening sleeve, the plurality of flexible retaining paws expand flexibly to remove from the peripheral groove;
    an operating member having a covering portion and a handle extending outwardly from the covering portion; the covering portion being fitted on the fixing ring and accommodating the coupling column and the flexible fastening sleeve therein;
    a coupling element employed to join a top end of the snapping insertion of the coupling column with the covering portion of the operating member.

2. The quick assembly structure of the faucet handle base as claimed in claim 1, characterized in that the directional connector includes an axial orifice for retaining the directional connector with the valve core, and the axial orifice has a stop fence formed therein to correspond to a tangent plane defined on an outer wall of the top end of the valve core so that the directional connector drives the valve core to rotate.

3. The quick assembly structure of the faucet handle base as claimed in claim 1, characterized in that the connecting portion of the locking element has outer threads; the valve core has a screwing orifice formed on the top end thereof to screw with the outer threads of the connecting portion.

4. The quick assembly structure of the faucet handle base as claimed in claim 3, characterized in that the locking element includes a cutout defined on the tilted guiding face to retain with a tool, such that the locking element is rotated after the tool is retained with and rotate the cutout.

5. The quick assembly structure of the faucet handle base as claimed in claim 1, characterized in that the central orifice of the fixing ring has at least one longitudinal engaging block mounted on an inner wall thereof; and the lower engagement portion of the flexible fastening sleeve has at least one longitudinal slot defined on an outer wall thereof, such that when the flexible fastening sleeve upwardly extends out of the central orifice of the fixing ring, the at least one longitudinal engaging block slides into and retains with the at least one longitudinal slot.

6. The quick assembly structure of the faucet handle base as claimed in claim 5, characterized in that the fixing ring has two longitudinal engaging blocks symmetrically mounted thereon; the flexible fastening sleeve has two longitudinal slots symmetrically defined thereon.

7. The quick assembly structure of the faucet handle base as claimed in claim 1, characterized in that the directional connector includes a plurality of tabs extending outwardly around a peripheral wall thereof; and the coupling column includes plural notches formed around an inner wall of the fitting portion of the coupling column to retain with the plurality of tabs.

8. The quick assembly structure of the faucet handle base as claimed in claim 1, characterized in that an outer diameter of the upper engagement portion of the flexible fastening sleeve is greater than the lower engagement portion so as to insert the upper engagement portion insert through the central orifice of the fixing ring.

9. The quick assembly structure of the faucet handle base as claimed in claim 8, characterized in that the upper engagement portion has a plurality of trenches extending from a top end thereof to a top end of the lower engagement portion, such that between any two trenches is defined a flexible pawl or a flexible claw, and between any two adjacent claws is defined a flexible pawl; the flexible claw has a hook portion extending outwardly from a top end thereof and retaining with or removing from the peripheral groove via each first recess.

10. The quick assembly structure of the faucet handle base as claimed in claim 9, characterized in that the flexible fastening sleeve has six trenches to define three flexible pawls and three flexible claws; and the snapping insertion of the coupling column has three first recesses arranged thereon.

11. The quick assembly structure of the faucet handle base as claimed in claim 9, characterized in that the hook portion of the flexible claw has an oblique face formed thereon, and the snapping insertion of the coupling column has a top fence and a conical tilting face opposite to the top fence, such that the coupling column is upwardly inserted through the flexible fastening sleeve to expand flexibly by abutting the conical tilting face against the oblique face of the hook portion, hence the snapping insertion of the coupling column inserts through the flexible pawl and the flexible claw until the hook portion aligns with each first recess of the coupling column, and then the hook portion of the flexible claw flexibly retracts to insert into the each first recess of the coupling column.

12. The quick assembly structure of the faucet handle base as claimed in claim 9, characterized in that when a side fringe of each first recess abuts against the hook portion of the flexible claw, the hook portion removes from the peripheral groove of the directional connector so that the coupling column removes upwardly from the directional connector.

13. The quick assembly structure of the faucet handle base as claimed in claim 1, characterized in that the covering portion has a slit defined on a bottom end thereof; and the fixing ring has a peripheral rib extending outwardly around a top end thereof and accommodated in the slit to stop water outside the peripheral rib.

14. The quick assembly structure of the faucet handle base as claimed in claim 1, characterized in that the coupling element is a forcing bolt, and the top fence of the snapping insertion of the coupling column has an aperture formed in a central portion thereof; the covering portion of the operating member has a threaded aperture arranged on a top wall of the covering portion so that the coupling element screws with the threaded aperture of the operating member via the aperture, thus connecting the coupling element with the coupling column.

15. The quick assembly structure of the faucet handle base as claimed in claim 1, characterized in that the coupling column has at least one second recesses formed on an outer wall thereof; and the operating member has at least one longitudinal protrusion arranged on an inner wall thereof to retain with the at least one second recess.

16. The quick assembly structure of the faucet handle base as claimed in claim 1, characterized in that the valve assembly extends out of a decorative cover; the handle mount further includes a waterproof washer retained on the bottom end of the covering portion of the covering member and contacting with a top wall of the decorative cover, such that the water does not leak between the covering portion and the decorative cover.

* * * * *